United States Patent [19]

Mikkleson

[11] Patent Number: 4,956,100
[45] Date of Patent: Sep. 11, 1990

[54] METHOD AND APPARATUS FOR MIXING AND SURFACE SKIMMING WATER TREATMENT BASINS

[75] Inventor: Kenneth A. Mikkleson, Madison, Wis.

[73] Assignee: Aqua-Aerobic Systems, Inc., Rockford, Ill.

[21] Appl. No.: 365,354

[22] Filed: Jun. 13, 1989

[51] Int. Cl.⁵ .............................................. C02F 1/40
[52] U.S. Cl. .............................. 210/717.6; 210/800; 210/122; 210/242.3; 210/523; 366/251; 366/270
[58] Field of Search ............ 210/776, 800, 122, 242.1, 210/242.3, 513, 523, 532.1; 366/251, 270

[56] References Cited

U.S. PATENT DOCUMENTS

| | | | |
|---|---|---|---|
| 781,406 | 1/1905 | Devereaux | 210/532.1 |
| 1,450,545 | 4/1923 | Hans | 210/122 |
| 2,245,589 | 6/1941 | Hughes | 316/270 |
| 3,547,553 | 12/1970 | Stanfield | 210/242.3 |
| 3,722,689 | 3/1973 | Markel et al. | 210/242.3 |
| 3,810,546 | 5/1974 | Oxenham | 210/242.3 |
| 3,830,370 | 8/1974 | Glaeser et al. | 210/242.3 |
| 3,831,756 | 8/1974 | Bhuta et al. | 210/242.3 |
| 3,853,767 | 12/1974 | Mohn | 210/242.3 |
| 3,923,661 | 12/1975 | Crisafulli | 210/242.3 |
| 4,011,164 | 3/1977 | McGivern | 210/525 |
| 4,014,795 | 3/1977 | in't Veld | 210/242.3 |
| 4,024,063 | 5/1977 | Mori | 210/242.3 |
| 4,154,678 | 5/1979 | Kole | 210/97 |
| 4,166,036 | 8/1979 | Barnhouser | 210/242.1 |
| 4,422,771 | 12/1983 | Earhart et al. | 366/251 |
| 4,695,376 | 9/1987 | Astrom et al. | 210/122 |
| 4,723,848 | 2/1988 | Knight | 366/290 |
| 4,733,972 | 3/1988 | Weis | 366/251 |

FOREIGN PATENT DOCUMENTS

| | | |
|---|---|---|
| 552117 | 6/1932 | Fed. Rep. of Germany . |
| 56-47804 | 11/1981 | Japan . |
| 59-177112 | 10/1984 | Japan . |
| 700455 | 12/1979 | U.S.S.R. . |

*Primary Examiner*—W. Gary Jones
*Assistant Examiner*—Christopher Upton
*Attorney, Agent, or Firm*—Vernon J. Pillote

[57] ABSTRACT

A method and apparatus for mixing a body of liquid in a treatment basin and for removing floating matter from the surface of the basin. A propeller type downflow mixer is buoyantly supported on a float in the basin with the inlet side of the mixer below the liquid level and the discharge side of the mixer arranged to direct the pumped liquid downwardly in the basin for mixing material in the basin. A shield is provided on the float overlying the inlet side of the pump to inhibit direct passage of liquid from the area of the basin above the shield and to induce an inflow pattern below the surface of the liquid toward the inlet of the pump. A scum receiving trough is mounted on the float and extends along the outer margin of the float with the upper weir edge adjacent the surface of the liquid in the basin to receive matter floating on the surface of the basin. Material received in the trough is selectively discharged to a receiver outside the basin.

8 Claims, 1 Drawing Sheet

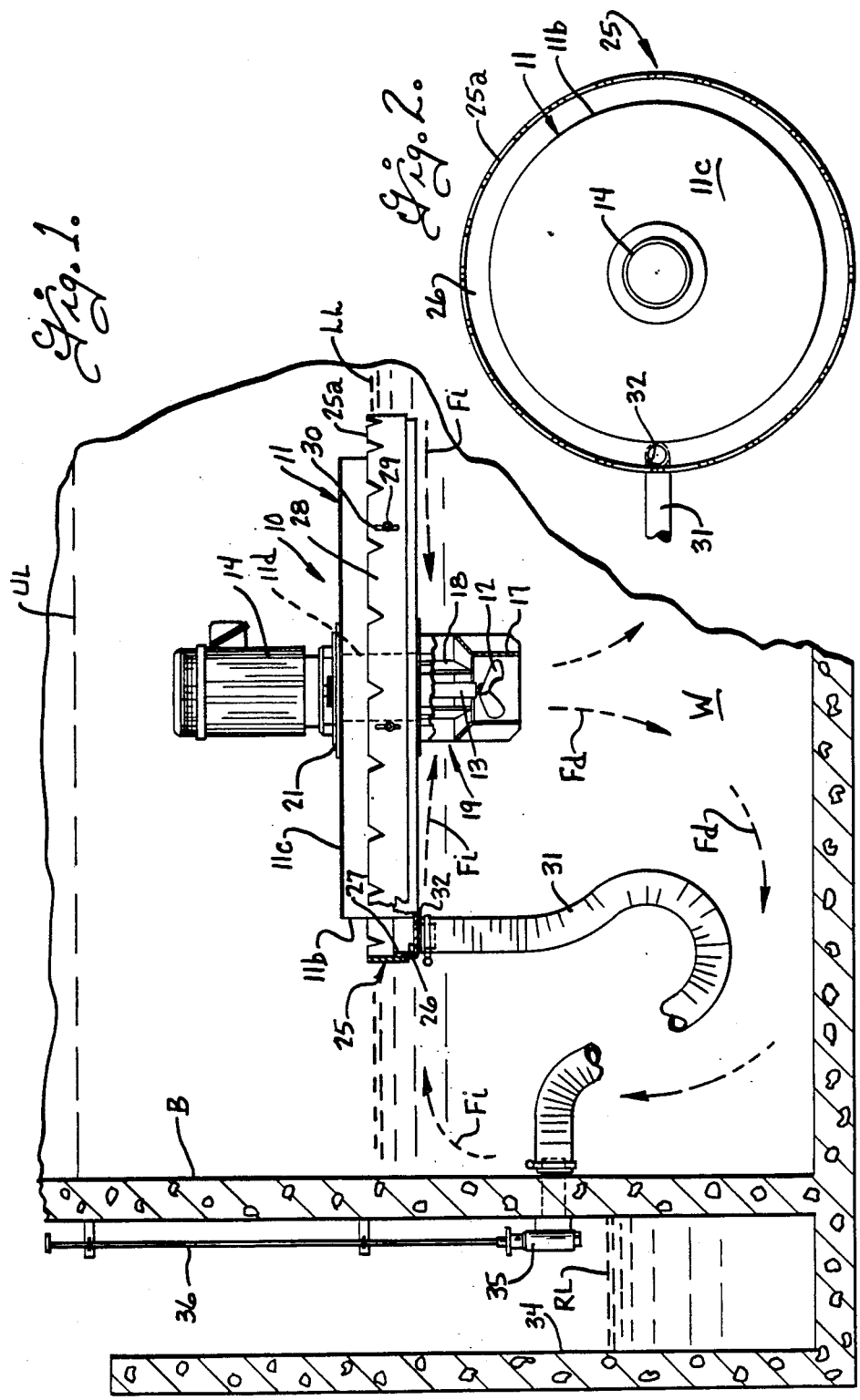

METHOD AND APPARATUS FOR MIXING AND SURFACE SKIMMING WATER TREATMENT BASINS

BACKGROUND OF THE INVENTION

Floating materials such as oil, scum, foam and the like collect on the surface of water treatment basins and, if not removed, can adversely affect operation of the water treatment system. In some prior scum removal systems, for example as disclosed in U.S. Pat. Nos. 4,011,164; 4,014,795 and 4,166,036 a skimmer such as a blade or wiper is moved across a surface of the liquid to push or guide floating materials toward and into a scum receiver. Such scum removal apparatus must not only be quite large to cover a substantial surface of the basin, but also become quite complex when it is necessary to accommodate variable liquid levels in the treatment basin. In another type of prior scum removal apparatus, such as disclosed in U.S. Pat. Nos. 3,923,661; 4,024,063 and 4,154,678 a weir is positioned by a float or by other apparatus at the surface of the liquid in the treatment basin and a pump is mounted on the weir to draw liquid over the weir into a scum receiver, and to pump liquid and floating materials from the scum receiver to a processing arrangement installed on land. In such apparatus, the movement of floating scum into and over the weir is induced by the pump action and this not only limits the surface area from which the floating weir can effectively remove floatable materials, but also involves pumping a substantial amount of water from the treatment basin and thus reduces the overall efficiency of the water treatment system.

SUMMARY OF THE INvENTION

It is an object of the present invention to overcome the disadvantages of the prior art by providing a method and apparatus for mixing liquid in a treatment basin and for removing floating matter from the surface of the liquid in the basin, and which utilizes a water circulation pattern produced by the mixer in the basin to advance floating materials in the basin toward a scum receiver.

Accordingly, the present invention provides a method for mixing liquid in the treatment basin and for removing floating matter from the surface of the liquid which comprises, supporting a propeller type pump apparatus having inlet and discharge sides on a floating support in a treatment basin with the inlet side of the pump apparatus below the surface of the liquid in the basin and with the discharge side of the pump apparatus arranged to direct liquid pumped thereby downwardly in the basin, supporting a scum collection trough having an upper weir edge defining a trough inlet, on the floating support with the upper weir edge adjacent the surface of the liquid in the basin to receive matter floating on the surface in the basin, driving the pump apparatus to draw liquid into the inlet side of the pump apparatus from below the surface of the liquid in the basin and to direct liquid from the discharge side of the pump apparatus downwardly in the basin to mix liquid in the basin, and discharging material from the collection trough. Discharge of material from the collection trough is preferably effected while the pump apparatus is being driven to mix the liquid in the basin. A shield is advantageously provided on the floating support above the inlet side of the pump and below the surface of the liquid in the basin to inhibit direct passage of liquid from the area of the basin above the shield to the inlet side of the pump and to induce an inlet flow pattern extending below the surface of the basin toward the scum collection trough.

The present invention further provides an apparatus for mixing a body of liquid in a treatment basin and for removing floating matter from the surface of a liquid and which comprises float means for buoyantly supporting the apparatus in a liquid treatment basin, a propeller type pump mounted on the float means for support thereby and having an inlet side below the surface of the liquid and a discharge side arranged to direct liquid pumped thereby downwardly in the basin, collection trough means mounted on the float means and having an upper weir edge defining a trough inlet adjacent the surface of the liquid to receive floating matter, and means for discharging matter from the collection trough.

BRIEF DESCRIPTION OF THE DRAWINGS

FIG. 1 is a fragmentary sectional view through a treatment basin having the mixing and skimming apparatus therein;

FIG. 2 is a plan view of the mixing and skimming apparatus.

DETAILED DESCRIPTION

The method and apparatus of the present invention is generally adapted for use in water treatment systems which require mixing of the liquid in the water treatment basin either intermittently or continuously, and in which accumulation of floatable materials such as oil, foam and other scum on the surface can either interfere with operation of the equipment or adversely affect the water treatment in the basin. The invention is particularly adapted for use in a sequencing batch reactor process of waste water treatment in which a basin or reactor is operated in a batch treatment mode involving a fill phase, a react phase, a settle phase and a decant phase. Depending on the treatment requirement of the specific SBR design, the fill cycle can be composed of static-fill, mix-only fill, as well as react-fill phases. Under static-fill, influent flow is introduced to the reactor under a non-mix, non-aerated environment. A mix-fill phase provides reactor mixing without aeration, and react-fill and the react phases involve both mixing and aeration. The suspended solids are allowed to settle during the settle phase, and the relatively clear effluent is withdrawn from the reactor during the decant phase. The duration and timing of the several phases varies in different installations and some of the phases can overlap.

Reference is now made to FIG. 1 wherein there is illustrated a float mounted mixer apparatus 10 disposed in a water treatment basin B, which basin may comprise any suitable tank or reservoir used for the treatment of liquids. In a sequencing batch reactor process of waste water treatment, the basin is operated in a batch treatment mode and the liquid level of the water W in the basin varies substantially between a low liquid level designated LL and upper liquid level designated UL in FIG. 1. The float supported mixer apparatus in general includes float means 11 for buoyantly supporting the apparatus at the surface of the liquid in the basin, a propeller type pump means mounted on the float means for support thereby and including a propeller 12 mounted for axial rotation on a shaft 13 and driven by a motor 14. The propeller is mounted on the float means so as to be disposed below the liquid level and the drive shaft 13 extends upwardly and is drivingly connected to the motor 14 mounted at the upper side of the float. The pump means advantageously includes an annular pump casing 17 that extends around the propeller and which is supported on the float as by struts 18 with the upper end of the pump casing spaced below the float to provide an annular pump inlet opening 19 between the casing and the underside of the float. The motor 14 is arranged to drive the propeller in a direction to pump liquid downwardly through the pump casing and the outlet side of the pump means is arranged to direct the pumped liquid downwardly in the basin in a downwardly directed discharge flow pattern indicated by the arrows Fd in FIG. 1, to produce mixing of suspendible solids and/or gases in the liquid in the basin. In the embodiment shown, the pump means and casing are arranged to direct the pump liquid vertically downwardly. However, it is contemplated that the pump means including the propeller and casing can be arranged to direct the pump liquid downwardly at an angle to the vertical, providing there is a substantial downward component sufficient to effect mixing of suspendible solids and/or gases in the liquid in the basin.

Provision is made for shielding the inlet side of the pump apparatus to inhibit direct passage of liquid from the area of the basin above the shield to the inlet side of the pump and to induce an inlet flow pattern extending below the surface of the liquid toward the inlet side of the pump. In the preferred embodiment illustrated, the float 11 has the configuration of flat annulus and includes a bottom wall 11a, an outer marginal side wall 11b, a top wall 11c, and an annular internal wall 11d that surrounds the pump shaft 13 and extends from the top wall to the bottom wall. A cover plate 21 is attached to the top wall of the float and closes the upper end of the internal wall 11d, and the motor 14 is mounted on the upper plate and extends upwardly from the float. The float may be formed of sheet metal or plastic and filled with a buoyant foam material, as is conventional. The floating mixer may advantageously be of the construction disclosed in U.S. Pat. No. 4,422,771, assigned to the assignee of the present invention, the disclosure of which patent is incorporated herein by reference. The float overlies and forms a shield over the inlet of the pump apparatus. The shield extends below the surface of the liquid to inhibit direct passage of liquid from the surface in the area of the basin above the shield and, when the pump is operated, it induces an inlet flow pattern indicated by the arrows Fi in FIG. 1, that extends below the surface of the liquid toward the pump inlet 19. It has been found that this inlet flow pattern of the mixer tends to move floating material such as oil, foam, scum and the like along a large surface area of the liquid in the basin toward the mixer, while substantially avoiding movement of the floating materials into the inlet of the pump apparatus.

In accordance with the present invention, a scum receiver or collection trough 25 for floating materials is provided on the float. The collection trough has an upper weir edge 25a that defines a trough inlet disposed adjacent the surface of the liquid in the basin to receive floating material therefrom. The collection trough extends along at least a portion of the outer margin of the float and generally crosswise of the incoming flow pattern Fi. In the downflow mixer illustrated wherein the discharge of the pump is directed vertically downwardly, the inlet flow pattern Fi extends toward the pump inlet from all sides of the float and the collection trough is advantageously arranged to extend around the entire margin of the float. As shown in FIG. 1, the collection trough 25 has a bottom 26 generally coplanar with the bottom wall 11a of the float and an upstanding flange 27. The upper weir edge 25a is formed on an annular band 28 that extends upwardly from the flange 27 and which is vertically adjustable relative thereto as by fasteners 29 that extend through vertically elongated slots 30 to enable vertical adjustment of the upper weir edge and thereby regulate the rate of flow of material from the surface into the trough. The upper weir edge is preferably formed with upwardly opening V-shaped weir notches, to facilitate more accurate adjustment of the rate of flow of material into the collection trough.

Floating material received in the collection trough 25 is discharged through a flexible discharge hose 31 connected to a discharge fitting 32 in the bottom of the collection trough. As shown in FIG. 1, the discharge hose 31 is arranged to drain by gravity to a receiver 34 in which the liquid level RL is maintained below the lower liquid level LL in the basin. A valve 35 is provided to control flow from the discharge valve and is arranged to be operated, for example manually as by an actuator 36. Alternatively, a pump (not shown) can be connected to the discharge hose 31 and operated to pump liquid from the hose 31 and hence from the collection trough.

The movement of floating materials on the surface of the basin toward the mixer occurs when the mixer is in operation. In some water treatment apparatus, such as in sequencing batch reactor systems, the mixer is only operated intermittently while in some other systems, the mixer may be operated continuously. In order to prevent excess withdrawal of liquid from the treatment tank during removing of floating materials, the valve or other means for controlling flow from the discharge line is preferably operated to effect discharge of material from the trough only during times when the mixer is in operation.

I claim:

1. A method for mixing liquid and suspendible solids or gases in a treatment basin and removing floating matter from a surface of the liquid comprising, supporting a propeller type pump apparatus having inlet and discharge sides on a floating support in a treatment basin with the inlet side of the pump apparatus in direct communication with the liquid in the basin at a level spaced below the surface thereof, providing a shield on the floating support above the inlet side of the pump apparatus and extending below the surface of the liquid in the basin to inhibit direct passage of liquid from the area of the basin above the shield to the inlet side of the pump apparatus and with the discharge side of the pump apparatus arranged to direct the liquid pumped thereby downwardly in the basin, supporting a collection trough having an upper weir edge defining a trough inlet on the floating support with the upper weir edge adjacent the surface of the liquid in the basin to receive matter floating on the surface of the basin, driving the pump apparatus to draw liquid into the inlet side of the pump apparatus from below the surface of the liquid in the basin and direct liquid from the discharge side of the pump apparatus downwardly in the basin at a velocity to mix the liquid and suspendible solids or gases in the basin, and discharging material from the collection trough.

2. The method of claim 1 wherein the material is discharged from the collection trough while the pump apparatus is being driven.

3. A method for mixing liquid and suspendible solids or gases in a treatment basin and removing floating matter from the surface of the liquid comprising, supporting a propeller type pump apparatus on a floating support in the basin with an inlet side of the pump apparatus in direct communication with the liquid in the basin at a level below the surface thereof and with a discharge side of the pump apparatus arranged to direct the liquid pumped thereby downwardly in the basin, providing a shield having an outer margin on the floating support above the inlet side of the pump apparatus and with the outer margin of the shield at a level below the surface of the liquid in the basin and spaced horizontally outwardly from the inlet side of the pump apparatus to direct liquid from the basin at a level below the surface of the liquid in the basin into the inlet side of the pump apparatus and to inhibit direct passage of liquid from the area of the basin above the shield to the inlet side of the pump apparatus, providing a collection trough having an upper weir edge defining a trough inlet extending along at least a portion of the outer margin of the shield with the upper weir edge adjacent the surface of the liquid in the basin to receive matter floating on the surface of the basin, driving the pump apparatus to draw liquid into the inlet side of the pump apparatus from the basin at a level below the shield and to direct liquid from the discharge side of the pump apparatus downwardly in the basin to mix the liquid and suspendible solids or gases in the basin, and discharging material from the collection trough.

4. An apparatus for mixing liquid and suspendible solids or gases in a treatment basin and for removing floating matter from a surface of the liquid comprising, float means for buoyantly supporting the apparatus in a liquid treatment basin, a propeller type pump means mounted on the float means for support thereby and including a pump casing having an upper inlet opening in direct communication with liquid in the basin below the surface of the liquid and a lower discharge opening arranged to direct liquid pumped thereby downwardly in the basin, and propeller means in the casing for pumping liquid from the inlet opening downwardly in the basin at a velocity to mix liquid and suspended solids or gases in the basin, flow impervious shield means supported on the float means above the propeller casing with at least an outer margin of the shield means at a level below the surface of the liquid in the basin and spaced horizontally outwardly from the inlet opening of the casing to direct liquid from the basin at a level below the surface of the basin into the inlet opening of the casing while inhibiting direct passage of liquid from the area of the basin above the shield to the inlet side of the pump means, collection trough means mounted on the float means for support thereby and having an upper weir edge defining trough inlet means adjacent the surface of the liquid to receive floating matter, and means for discharging matter from the collection trough.

5. An apparatus for mixing a body of liquid and suspendible solids or gases in a liquid treatment basin and for removing matter from the surface of the liquid treatment basin comprising, float means for buoyantly supporting the apparatus in an open surface water treatment basin, the float means having a bottom wall means and outer wall means extending upwardly from the bottom wall means, motor driven pump means mounted on the float means for support thereby and including a pump casing having an upper inlet opening in direct communication with liquid in the basin and spaced below the bottom wall means of the float means and a lower discharge opening and a propeller in the pump casing for pumping liquid downwardly in the basin at a velocity to mix liquid and suspendible solids or gases in the basin, the bottom wall means having an outer margin means at a level below the surface of the liquid in the basin and spaced horizontally outwardly from the inlet opening in the casing to direct liquid from the basin at a level below the surface of the basin into the inlet opening of the casing while inhibiting direct passage of liquid from the area of the basin above the shield to the inlet side of the pump means, collection trough means extending along at least a portion of said outer wall means and having an upper weir edge spaced outwardly of said outer wall means defining inlet means adjacent the liquid level in the basin, and means for discharging liquid from the trough means.

6. An apparatus according to claim 5 wherein said outer wall means is annular and said trough means extends around at least a major portion of said outer wall means.

7. An apparatus according to claim 5 including selectively operable valve means for shutting off flow through said means for discharging liquid from the trough means.

8. An apparatus according to claim 5 wherein said trough means includes means for adjusting the vertical height of said upper weir edge relative to said float means to regulate flow into the collection trough means.

* * * * *

UNITED STATES PATENT AND TRADEMARK OFFICE
CERTIFICATE OF CORRECTION

PATENT NO.   : 4,956,100
DATED        : September 11, 1990
INVENTOR(S)  : Kenneth A. Mikkelson It is certified that error appears in the above-identified patent and that said Letters Patent is hereby corrected as shown below: Title page: item (19) and (75)

Correct the spelling of the inventor's name. Change "Mikkleson" to -- Mikkelson --.

Signed and Sealed this

Fourth Day of February, 1992

Attest:

HARRY F. MANBECK, JR.

Attesting Officer

Commissioner of Patents and Trademarks